(12) United States Patent
Joos

(10) Patent No.: US 11,804,611 B2
(45) Date of Patent: Oct. 31, 2023

(54) FUEL CELL START UP METHOD

(71) Applicant: HYDROGENICS CORPORATION, Mississauga (CA)

(72) Inventor: Nathaniel Ian Joos, Mississauga (CA)

(73) Assignee: HYDROGENICS CORPORATION, Mississauga (CA)

( * ) Notice: Subject to any disclaimer, the term of this patent is extended or adjusted under 35 U.S.C. 154(b) by 33 days.

(21) Appl. No.: 17/407,808

(22) Filed: Aug. 20, 2021

(65) Prior Publication Data

US 2021/0384535 A1 Dec. 9, 2021

Related U.S. Application Data

(63) Continuation of application No. 16/422,279, filed on May 24, 2019, now Pat. No. 11,101,477, which is a
(Continued)

(51) Int. Cl.
*H01M 8/04302* (2016.01)
*H01M 8/04303* (2016.01)
(Continued)

(52) U.S. Cl.
CPC ....... *H01M 8/04302* (2016.02); *H01M 8/043* (2016.02); *H01M 8/04089* (2013.01);
(Continued)

(58) Field of Classification Search
None
See application file for complete search history.

(56) References Cited

U.S. PATENT DOCUMENTS 4,069,371 A 1/1978 Zito
5,780,981 A * 7/1998 Sonntag ................. B60L 58/31
429/432
(Continued)

FOREIGN PATENT DOCUMENTS

CA 2471180 A1 5/2010
CA 2792711 A1 9/2011
(Continued)

OTHER PUBLICATIONS

Abstract of JP-2005036736-A. (Year: 2005).*
(Continued)

*Primary Examiner* — Gregg Cantelmo
(74) *Attorney, Agent, or Firm* — Barnes & Thornburg LLP

(57) ABSTRACT

A fuel cell module is configured or operated, or both, such that after a shut down procedure a fuel cell stack is discharged and has its cathode electrodes at least partially blanketed with nitrogen during at least some periods of time. If the fuel cell module is restarted in this condition, electrochemical reactions are limited and do not quickly recharge the fuel cell stack. To decrease start up time, air is moved into the cathode electrodes before the stack is recharged. The air may be provided by a pump, fan or blower driven by a battery or by the flow or pressure of stored hydrogen. For example, an additional fan or an operating blower may be driven by a battery until the fuel cell stack is able to supply sufficient current to drive the operating blower for normal operation.

20 Claims, 6 Drawing Sheets

Related U.S. Application Data continuation of application No. 14/389,877, filed as application No. PCT/CA2013/050256 on Mar. 28, 2013, now Pat. No. 10,741,859.

(60) Provisional application No. 61/619,073, filed on Apr. 2, 2012.

(51) Int. Cl.
*H01M 8/04089* (2016.01)
*H01M 8/043* (2016.01)
*H01M 8/04746* (2016.01)
*H01M 8/04225* (2016.01)
*H01M 8/04858* (2016.01)
*H01M 8/04955* (2016.01)
*H01M 8/04223* (2016.01)
*H01M 16/00* (2006.01)
*H01M 8/10* (2016.01)

(52) U.S. Cl.
CPC ... *H01M 8/04225* (2016.02); *H01M 8/04303* (2016.02); *H01M 8/04753* (2013.01); *H01M 8/04238* (2013.01); *H01M 8/04947* (2013.01); *H01M 8/04955* (2013.01); *H01M 16/003* (2013.01); *H01M 2008/1095* (2013.01)

(56) References Cited

U.S. PATENT DOCUMENTS

| | | | |
|---|---|---|---|
| 6,215,272 B1 | 4/2001 | Ohara | |
| 6,268,074 B1* | 7/2001 | Siepierski | H01M 8/04119 429/429 |
| 6,399,231 B1 | 6/2002 | Donahue | |
| 6,939,633 B2 | 9/2005 | Goebel | |
| 7,291,411 B2 | 11/2007 | Pettit | |
| 7,425,379 B2 | 9/2008 | Voos | |
| 7,465,507 B2 | 12/2008 | Devries | |
| 7,670,700 B2 | 3/2010 | Imamura | |
| 7,862,943 B2 | 1/2011 | Hortop | |
| 8,048,579 B2 | 11/2011 | Robb | |
| 8,125,193 B2 | 2/2012 | Page | |
| 8,283,082 B2 | 10/2012 | Ojima | |
| 8,492,046 B2 | 7/2013 | Yu | |
| 10,181,610 B2 | 1/2019 | Forte | |
| 2003/0111977 A1 | 6/2003 | Pearson | |
| 2004/0001980 A1 | 1/2004 | Balliet | |
| 2004/0076860 A1 | 4/2004 | Aso | |
| 2004/0096711 A1* | 5/2004 | Zinser | H01M 16/006 429/432 |
| 2004/0219399 A1* | 11/2004 | Zhu | H01M 8/04955 429/468 |
| 2005/0026022 A1* | 2/2005 | Joos | H01M 8/04425 429/429 |
| 2005/0031917 A1* | 2/2005 | Margiott | H01M 8/04225 429/456 |
| 2005/0106424 A1 | 5/2005 | Elhamid | |
| 2005/0136297 A1* | 6/2005 | Inai | B60L 58/31 429/513 |
| 2005/0186454 A1 | 8/2005 | Clingerman | |
| 2005/0227126 A1 | 10/2005 | Korytnikov | |
| 2005/0271908 A1* | 12/2005 | Lin | H01M 8/04302 429/429 |
| 2005/0282057 A1* | 12/2005 | Brenner | H01M 8/04104 429/513 |
| 2006/0083965 A1 | 4/2006 | Rainville | |
| 2006/0093879 A1 | 5/2006 | Yang | |
| 2006/0115700 A1 | 6/2006 | Kotani | |
| 2006/0194087 A1 | 8/2006 | Park | |
| 2006/0238033 A1 | 10/2006 | Raiser | |
| 2007/0042243 A1 | 2/2007 | Bai | |
| 2008/0038595 A1 | 2/2008 | Buchi | |
| 2008/0038602 A1* | 2/2008 | Yu | H01M 8/04223 429/432 |
| 2008/0057361 A1* | 3/2008 | Moon | H01M 8/0618 429/444 |
| 2008/0160370 A1 | 7/2008 | Masse | |
| 2008/0248346 A1 | 10/2008 | Fujimara | |
| 2009/0243390 A1 | 10/2009 | Oto | |
| 2009/0280373 A1 | 11/2009 | Baaser | |
| 2010/0035096 A1 | 2/2010 | Britz | |
| 2010/0239927 A1 | 9/2010 | Moran | |
| 2010/0310955 A1 | 12/2010 | Yadha | |
| 2010/0316926 A1* | 12/2010 | Ishikawa | H01M 8/04753 429/444 |
| 2011/0003222 A1 | 1/2011 | Margiott | |
| 2013/0164645 A1 | 6/2013 | Takaichi | |
| 2014/0295306 A1* | 10/2014 | Kikuchi | B60L 58/33 429/429 |

FOREIGN PATENT DOCUMENTS

| | | | | |
|---|---|---|---|---|
| CN | 1618143 A | | 5/2005 | |
| CN | 101222064 A | | 7/2008 | |
| CN | 101405905 A | * | 4/2009 | ........ H01M 8/04104 |
| CN | 101911356 A | | 12/2010 | |
| DE | 102011115846 A1 | | 4/2013 | |
| JP | 2005036736 A | * | 2/2005 | |
| JP | 2005302648 A | | 10/2005 | |
| JP | 2006286558 A | | 10/2006 | |
| JP | 2009123599 A | | 6/2009 | |
| JP | 2012003957 A | * | 1/2012 | ........ H01M 8/04097 |
| KR | 20040005144 A | | 1/2004 | |
| KR | 20110058459 A | | 6/2011 | |
| NO | 2008027043 A1 | | 3/2008 | |
| WO | 2004114448 A2 | | 12/2004 | |
| WO | 2005036683 A1 | | 4/2005 | |
| WO | 2007090284 A1 | | 8/2007 | |
| WO | 2011077229 A1 | | 6/2011 | |

OTHER PUBLICATIONS

Abstract of JP-2012003957-A. (Year: 2012).*
Abstract of CN-101405905-A. (Year: 2009).*
European Patent Application No. EP13773056, Supplementary European Search Report dated Dec. 9, 2015.
International Patent Application No. PCT/CA2013/050256, International Preliminary Report on Patentability dated Oct. 16, 2014.
International Patent Application No. PCT/CA2013/050256, International Search Report and Written Opinion dated Jul. 2, 2013.
Nishizawa et al., "Fuel Cell and Li-ion Battery Direct Hybridization System for Aircraft Applications," Journal of Power Sources, Jan. 2013, vol. 222, pp. 294-300.
Page et al., "Testing Procedure for Passive Fuel Cell State of Health," Australasian Universities Power Engineering Conference, Sep. 2004, 6 pages.
San Martin, et al., "Modelling of PEM Fuel Cell Performance: Steady-State and Dynamic Experimental Validation," Energies, Feb. 2014, vol. 7, pp. 670-700.

* cited by examiner

FUEL CELL START UP METHOD

CROSS-REFERENCES TO RELATED APPLICATIONS

This application is a continuation of U.S. Pat. No. 11,101,477, filed May 24, 2019, which is a continuation of U.S. Pat. No. 10,741,859, filed Oct. 1, 2014, which is a National Stage Entry under 35 U.S.C. § 371(b) of International Application No. PCT/CA2013/050256, filed Mar. 28, 2013, which claims the benefit of priority under 35 U.S.C. § 119 (e) to U.S. Application Ser. No. 61/619,073, filed on Apr. 2, 2012, the entire disclosure of all of which are expressly incorporated herein by reference.

FIELD

The invention relates to fuel cells, and, in particular to a method and apparatus for restarting a fuel cell.

BACKGROUND

A fuel cell converts chemical energy stored in a fuel into a useful form of energy, such as for example, electricity. One example of a particular type of fuel cell is a Proton Exchange Membrane (PEM) fuel cell that is operable to produce electricity.

A typical PEM fuel cell includes an electrolyte membrane arranged between an anode electrode and a cathode electrode. Hydrogen fuel is supplied to the anode electrode and an oxidant is supplied to the cathode electrode. Within the PEM fuel cell the hydrogen fuel and the oxidant are employed as reactants in a set of complementary electrochemical reactions that yield electricity, heat and water.

A number of factors cause other undesired reactions to occur that increase the rate of wear and degradation experienced by some components of a PEM fuel cell. For example, small amounts of hydrogen fuel and oxidant remaining inside a PEM fuel cell, after respective supplies of these reactants are closed off, are known to combust during shutdown and restarting processes. Combustion within a PEM fuel cell causes the deterioration of various components including the electrolyte membrane and catalyst layers deposited on the electrodes. The cumulative deterioration of various components significantly reduces the efficiency of the PEM fuel cell and may lead to failure of the PEM fuel cell.

More specifically, combustion as opposed to electrochemical consumption of the hydrogen and oxygen occurs because the conditions within a PEM fuel cell module start to change as support systems operable during the normal operation (i.e. the "on" state) of the PEM fuel cell module are switched to an "off" state. As the internal conditions change, some hydrogen molecules diffuse to the cathode side of the membrane and burn in the presence of the oxygen. Similarly, some oxygen molecules diffuse across the membrane and react with the hydrogen fuel on the anode side of the membrane. The diffusion of hydrogen across the membrane is actually more common (in the absence of a driving differential pressure across the membrane) since hydrogen molecules are smaller than oxygen molecules, and, thus more readily diffuse through the membrane.

Another undesired reaction that may occur is the electrochemical corrosion of at least one catalyst layer within a PEM fuel cell. This further deteriorates the performance of a PEM fuel cell.

U.S. Pat. No. 7,425,379 B2, entitled Passive Electrode Blanketing in a Fuel Cell and issued on Sep. 16, 2008, describes a fuel cell module having a fuel cell stack, a parasitic load connectable across the electrodes, and a reactant reservoir for storing an amount of a first reactant such as hydrogen. When the fuel cell module is shutdown, the stored amount of the first reactant can be drawn to react with an amount of a second reactant (e.g., oxygen in air) remaining in the stack to electrochemically consume the first and second reactants, thereby leaving a mixture that substantially comprises a non-reactive agent (e.g., nitrogen), thereby passively blanketing the electrodes. The parasitic load limits the voltage of the fuel cell stack and induces the electrochemical consumption of the first and second reactants remaining in the stack during shutdown. A pressure gradient between the electrodes and an optional check valve may allow for movement of the non-reactive agent between electrodes. A process related to said fuel cell module is also provided.

Introduction to the Invention

The following discussion is intended to introduce the reader to the detailed description to follow, and not to limit or define any claimed invention.

The inventor has observed that a fuel cell that has been blanketed with a non-reactive agent, for example a fuel cell that has been shut down as described in U.S. Pat. No. 7,425,379 B2, can require varying amounts of time to restart. For example, a fuel cell that has been shut down for only a minute, and a fuel cell that has been shut down for a day or more, tend to restart essentially immediately. A fuel cell that has been shut down for an hour, however, may take longer to restart. The delayed start is less noticeable when a battery, typically provided to operate valves and electronic controls while the fuel cell stack is not operating, is sufficiently large. However, it is generally desirable to reduce the size of the battery to the extent possible.

When a fuel cell module is shut down, its fuel cell stack is typically left in a discharged state to, among other reasons, avoid presenting an unsuspected electrical hazard. Without intending to be limited by theory, it is possible that at some periods of time following a shut down with passive electrode blanketing, the cathode electrodes of the fuel cell stack are so completely blanketed with nitrogen that there is very little, if any, oxygen available to the cathode electrodes. Electrochemical reactions are correspondingly limited, or not available, and so do not quickly electrically re-charge the fuel cell stack when the fuel cell module is restarted. A similar problem might occur in a fuel cell stack that was blanketed with a non-reactive agent by way of some other process.

A process and apparatus are described herein to introduce oxygen to the cathode electrode of a fuel cell stack during start up. While a fuel cell module typically has a blower adapted to supply air to the cathode during operation, this operating blower is sized to provide sufficient air for the maximum power output of the fuel cell stack and is typically powered by the fuel cell stack after the fuel cell stack has been re-charged. The process and apparatus provide a lesser flow of oxygen, but at a reduced power requirement. This lesser flow of oxygen can be powered or instigated by a battery before the fuel cell stack is recharged.

A fuel cell module is described herein having a fuel cell stack with a device to supply a reactant (e.g., oxygen in air) to one or more cathode electrodes. The device, such as a fan, a pump or the operating blower, is operable by way of an electrical input provided by a battery before the stack is charged, by pressure energy, or both. For example, but without limitation, the device may be a fan provided in fluid communication with a cathode electrode. The fan is provided in addition to an operating blower used to supply air to the fuel cell stack after start up, and has a lower threshold power requirement than the operating blower. Optionally, the fan may be used as a flow meter when the blower is operating. In an alternative module, a circuit is provided that allows the battery to turn the operating blower at low speed for a period of time, for example until the fuel cell stack is recharged.

A process for starting a fuel cell module is described herein. The process has a step of providing a flow of oxygen to a cathode electrode before the fuel cell stack is charged or without using power produced by the fuel cell stack. The cathode electrode may have been previously blanketed with a non-reactive agent. Optionally, the flow of oxygen may be provided or instigated by an electrical device driven by a battery.

In one fuel cell module described in the detailed description, there is: a fuel cell stack including at least one fuel cell, each fuel cell including an anode electrode, a cathode electrode and an electrolyte medium arranged between the anode electrode and the cathode electrode, wherein during normal operation the anode electrode is provided with a first reactant and the cathode electrode is provided with a first mixture containing a second reactant and a non-reactive agent; a parasitic load that is connectable across the anode and the cathode electrodes; a reactant reservoir, connectable to the anode electrode, and able to store an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume some or all of the amounts of the first or second reactants, or both, thereby leaving a second mixture that substantially comprises the non-reactive agent; and a fan, pump or blower connected or connectable to the cathode electrode and operable to supply the first mixture to the cathode electrode while the fuel cell is not charged. The reactant reservoir may be, for example, a separate tank or piping used to provide the first mixture during ordinary operation of the fuel cell module. The reactant reservoir may be sized, or may be re-fillable, such that an amount of the first reactant, in addition to first reactant remaining in the fuel cell stack on shutdown, may be provided to electrochemically consume the amount of the second reactant remaining in, and drawn into, the fuel cell module during the shutdown process. The fuel cell module also has a means for providing, during a restarting procedure, more of the fixed mixture to the cathode electrode using a source of power other than the fuel cell stack, for example until the fuel cell stack is charged.

In one process described in the detailed description, for shutting down and re-starting a fuel cell, the fuel cell including a first electrode, a second electrode and an electrolyte membrane arranged between the first and second electrodes, wherein during normal operation the first electrode is provided with a first reactant and the second electrode is provided with a first mixture containing a second reactant and a non-reactive agent, the process comprises: stopping an inflow of the first reactant into the first electrode; cutting-off power to supporting balance of plant elements; drawing current through a parasitic load connectable across the first and second electrodes; providing an amount of a first reactant for the electrochemical consumption of a remaining amount of a second reactant; permitting a delayed inflow of an amount of the first mixture into the second electrode, optionally wherein the amount of the first reactant and first reactant remaining in the fuel cell stack on shutdown electrochemically react with the remaining and inflowing amounts of the second reactant, thereby leaving a second mixture that comprises the non-reactive agent; and, to re-start the fuel cell module, providing a flow or amount of the first mixture before the fuel cell stack is re-charged or by power drawn from a source other than the fuel cell stack.

Other aspects and features of the present invention will become apparent, to those ordinarily skilled in the art, upon review of the following description of one or more examples or processes and apparatus. The examples are intended to include at least one embodiment of every claim, but every example is not necessarily an embodiment of every claim, and every claim does not necessarily include every example. The examples may also include features that are not steps or elements of any claim.

DETAILED DESCRIPTION

A fuel cell module is typically made up of a number of fuel cells connected in series to form a fuel cell stack. The fuel cell module also includes a suitable combination of associated structural elements, mechanical systems, hardware, firmware and software that is employed to support the function and operation of the fuel cell module. Such items include, without limitation, piping, sensors, regulators, current collectors, seals and insulators.

Figure 1:
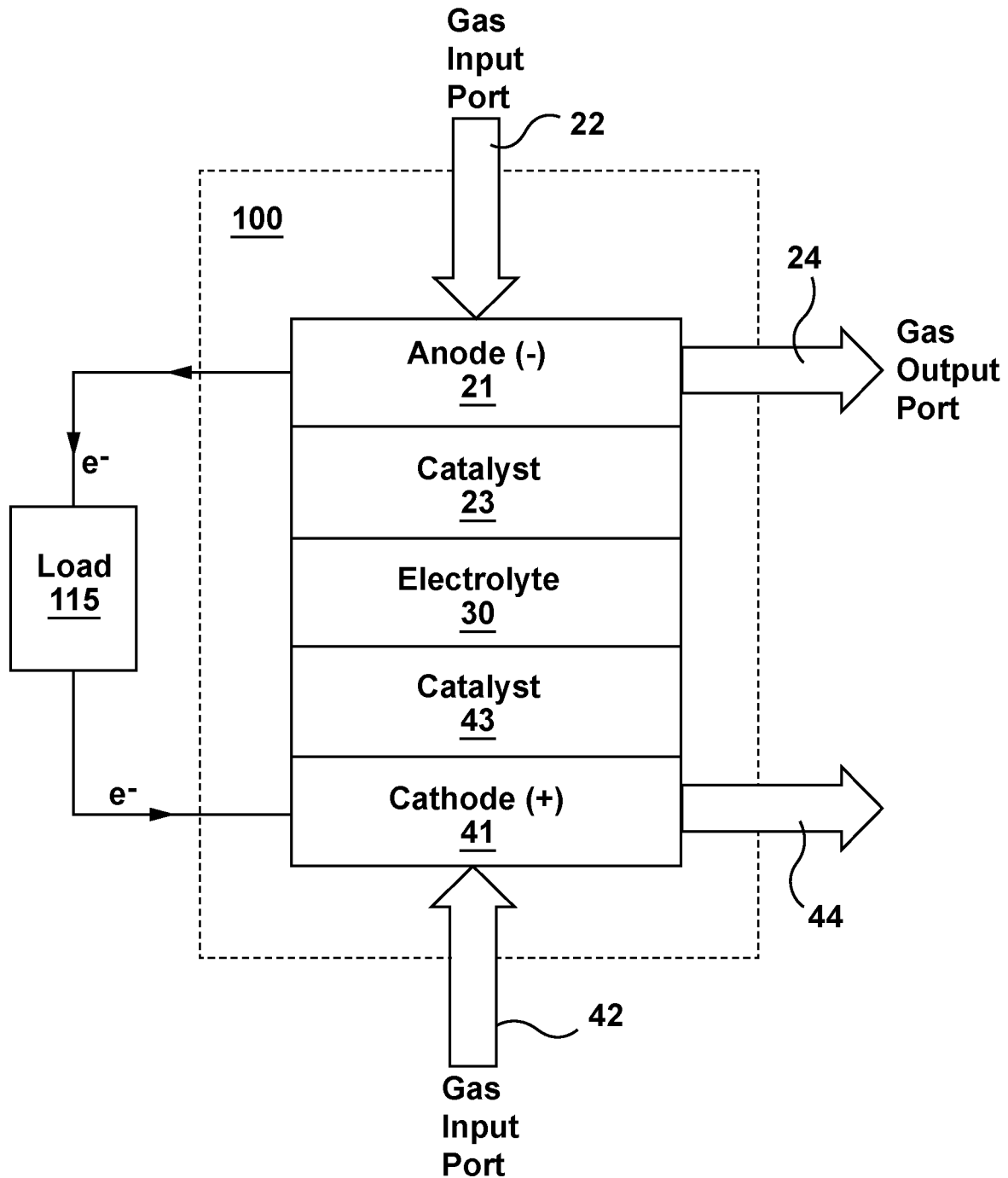
FIG. 1 is a simplified schematic diagram of a fuel cell module.

Referring to FIG. 1, shown is a simplified schematic diagram of a Proton Exchange Membrane (PEM) fuel cell module, simply referred to as fuel cell module 100 hereinafter, that is described herein to illustrate some general considerations relating to the operation of fuel cell modules. It is to be understood that the present invention is applicable to various configurations of fuel cell modules that each include one or more fuel cells.

There are a number of different fuel cell technologies, and in general, this invention is expected to be applicable to all types of fuel cells. Besides Proton Exchange Membrane (PEM) fuel cells, other types of fuel cells include, without limitation, Alkaline Fuel Cells (AFC), Direct Methanol Fuel Cells (DMFC), Molten Carbonate Fuel Cells (MCFC), Phosphoric Acid Fuel Cells (PAFC), Solid Oxide Fuel Cells (SOFC) and Regenerative Fuel Cells (RFC).

The fuel cell module 100 employs hydrogen as a fuel and air as a source for an oxidant. Air is approximately 80% nitrogen ($N_2$) and 20% oxygen ($O_2$) and is thus a suitable source of the oxidant. These percentages have been approximated ignoring the presence of other gases in the atmosphere (e.g. $CO_2$, CO, $SO_2$, PbS, etc.).

The fuel cell module 100 includes an anode electrode 21 and a cathode electrode 41. The anode electrode 21 includes a gas input port 22 and a gas output port 24. Similarly, the cathode electrode 41 includes a gas input port 42 and a gas output port 44. An electrolyte membrane 30 is arranged between the anode electrode 21 and the cathode electrode 41.

The fuel cell module 100 also includes a first catalyst layer 23 between the anode electrode 21 and the electrolyte membrane 30, and a second catalyst layer 43 between the cathode electrode 41 and the electrolyte membrane 30. In some embodiments the first and second catalyst layers 23, 43 are deposited on the anode and cathode electrodes 21,41, respectively.

A load 115 is coupled between the anode electrode 21 and the cathode electrode 41.

In operation, fuel comprising hydrogen is introduced into the anode electrode 21 via the gas input port 22 under some conditions. Examples of the conditions include, without limitation, factors such as flow rate, temperature, pressure, relative humidity and a mixture of the hydrogen with other gases. The hydrogen reacts electrochemically according to reaction (1), given below, in the presence of the electrolyte membrane 30 and the first catalyst layer 23.

$$H_2 + 2H^+ + 2e^- \qquad (1)$$

The chemical products of reaction (1) are hydrogen ions (i.e. cations) and electrons. The hydrogen ions pass through the electrolyte membrane 30 to the cathode electrode 41 while the electrons are drawn through the load 115. Excess hydrogen (sometimes in combination with other gases and/or fluids) is drawn out through the gas output port 24.

Simultaneously an oxidant, such as oxygen in the air, is introduced into the cathode electrode 41 via the gas input port 42 under some conditions. Examples of the conditions include, without limitation, factors such as flow rate, temperature, pressure, relative humidity and a mixture of the oxidant with other gases. The excess gases, including unreacted oxidant and the generated water are drawn out of the cathode electrode 41 through the gas output port 44.

The oxidant reacts electrochemically according to reaction (2), given below, in the presence of the electrolyte membrane 30 and the second catalyst layer 43.

$$\tfrac{1}{2}O_2 + 2H^+ + 2e^- = H_2O \qquad (2)$$

The chemical product of reaction (2) is water. The electrons and the ionized hydrogen atoms, produced by reaction (1) in the anode electrode 21, are electrochemically consumed in reaction (2) in the cathode electrode 41. The electrochemical reactions (1) and (2) are complementary to one another and show that for each oxygen molecule ($O_2$) that is electrochemically consumed two hydrogen molecules ($H_2$) are electrochemically consumed.

Continuously supplying a fuel cell module (e.g. the fuel cell module 100 illustrated in FIG. 1) with hydrogen fuel and oxidant to drive electrochemical reactions (1) and (2) is wasteful and is unnecessary in many situations, such as, for example, where there is a fluctuating or intermittent load. However, in some instances shutting down a fuel cell module initiates one or more undesired reactions that degrade some components of the fuel cell module. Thus, it is desirable to be able to reliably turn-off (i.e. shutdown) and re-start a fuel cell module without causing excessive degradation to some components of the fuel cell module. In some fuel cell modules 100 there is provided a modification that reduces the rate of wear and degradation experienced by some components of the fuel cell module during shutdown and re-starting periods. In some fuel cell modules 100, the modification is adapted to passively reduce the rate of wear and degradation, whereas in other embodiments active mechanisms are employed to support passive reduction in the rate of wear and degradation. In particular, in some fuel cell modules 100 the rate of wear and degradation is reduced by reducing the amount of combustion of the remaining reactants while increasing the electrochemical consumption of those reactants during a shutdown process.

Figure 2:
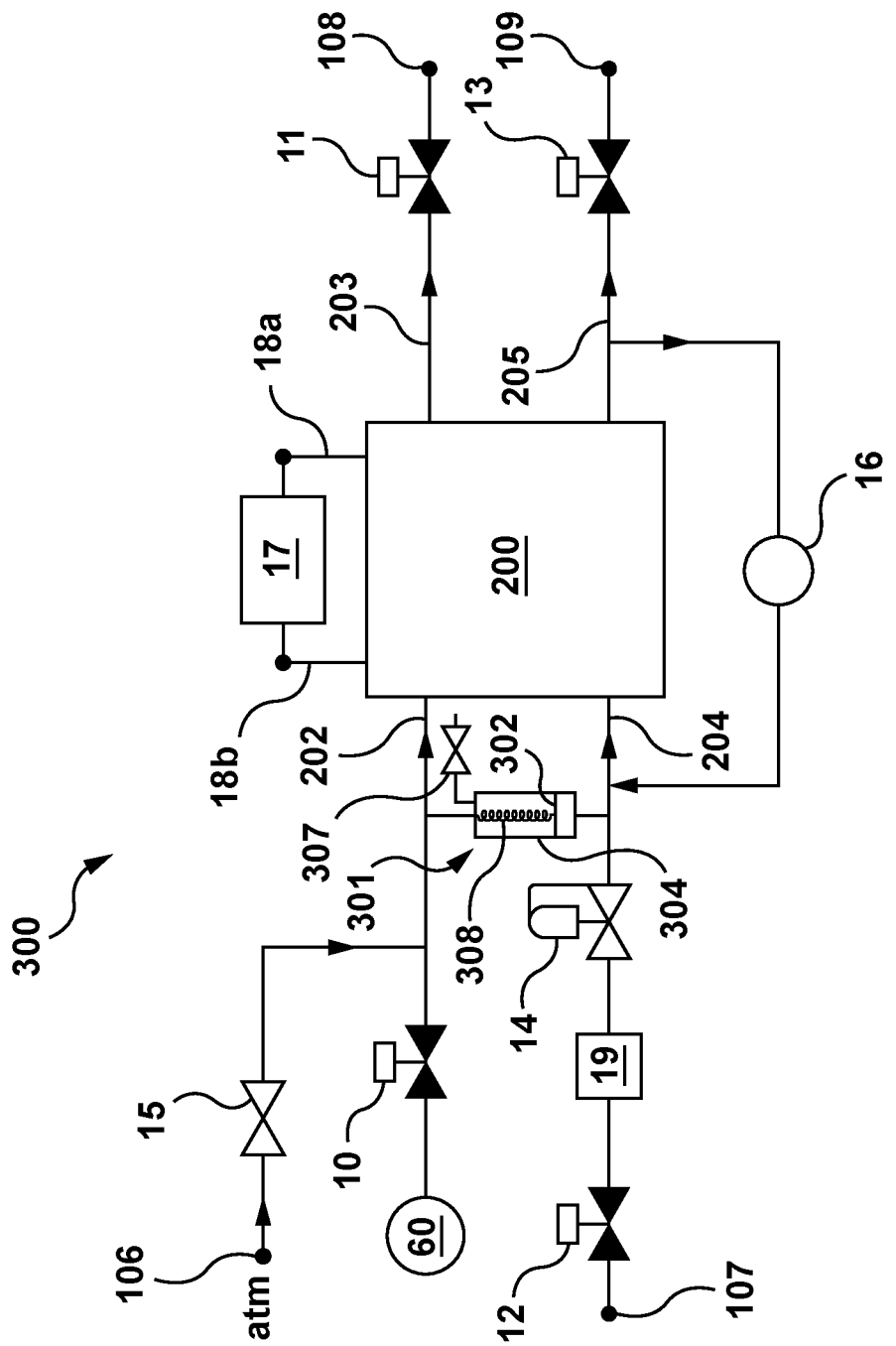
FIG. 2 is a schematic diagram illustrating a first arrangement of a fuel cell module.

Referring to FIG. 2, shown is a schematic diagram illustrating a fuel cell module 300. Those skilled in the art will appreciate that a fuel cell module also includes a suitable combination of supporting elements, commonly referred to as balance of plant, which are not shown in FIG. 2 but could be provided with the fuel cell module 300.

The fuel cell module 300 includes a fuel cell stack 200 that is made up of one of more PEM fuel cells. Each PEM fuel cell (not shown) includes an electrolyte membrane arranged between an anode electrode and a cathode electrode as schematically illustrated in FIG. 1. The fuel cell stack 200 has a cathode inlet port 202, a cathode outlet port 203, an anode inlet port 204 and an anode outlet port 205. The cathode inlet and outlet ports 202,203 are fluidly connected to each of the respective cathode electrodes included in the fuel cell stack 200. Similarly, the anode inlet and outlet ports 204,205 are fluidly connected to each of the respective anode electrodes included in the fuel cell stack 200.

The fuel cell stack 200 also includes electrical connections 18a,b across which a load (e.g., an electric motor) is connectable. A relatively small parasitic load 17 is optionally connected across the electrical connections 18a,b of the fuel cell stack 200. The small parasitic load 17 helps to limit the voltage response during a shutdown process, which is described in more detail below.

The value of the parasitic load 17 is preferably chosen to be relatively small compared to an actual load (e.g. the electric motor) that the fuel cell module 300 supplies power to, so that the amount of power dissipated by the parasitic load 17 during normal operation is relatively small compared to the amount of power dissipated through the actual load. Optionally, the parasitic load 17 is chosen such that it dissipates less than 0.03% the amount of power dissipated by the actual load during normal operation.

In FIG. 2, the small parasitic load 17 is permanently coupled across the electrical connections 18a,b and thus, power is dissipated by the small parasitic load 17 during normal operation. Optionally, the small parasitic load 17 may be arranged so that it is coupled across the electrical connections 18a,b of the fuel cell stack 200 immediately before or after the fuel cell module 300 is shutdown and is decoupled from the fuel cell stack 200 during normal operation.

Alternatively, the parasitic load 17 may be made-up of internal impedances within the fuel cell stack 200. In particular, the membrane(s) included in the fuel cell stack 200 may provide enough of an internal resistance to serve as an adequate parasitic resistance during a shutdown process for limiting the voltage response of the fuel cell stack 200.

The fuel cell module 300 includes input valves 10 and 12 that are controllable to cut-off the inflow of reactant gases to the cathode inlet port 202 and the anode inlet port 204, respectively. Similarly, output valves 11 and 13 are provided to controllably cut-off the outflow of exhaust gases from the cathode outlet port 203 and the anode outlet port 205, respectively.

The input valve 10 is connected in series between the cathode inlet port 202 and a blower 60. The blower 60 is any device (e.g., a motorized fan, a compressor, etc.) suitable to force air into the cathode inlet port 202 when the valve 10 is open. Optionally, the blower 60 also serves to passively deter, but not necessarily stop, the free flow of air into the cathode inlet port 202 when power is cut-off from the blower 60. This is described in more detail below with reference to FIGS. 3, 4 and 6.

The input valve 12 is connected in series between a fuel supply port 107 and the anode inlet port 204. The fuel supply port 107 is further connectable to a hydrogen fuel supply vessel (not shown) or some other hydrogen fuel delivery system (not shown). A fuel reservoir 19 and a flow control device 14 are connected respectively in series between the input valve 12 and the anode inlet port 204.

The output valve 11 is connected in series between the cathode outlet port 203 and a first exhaust port 108. Similarly, the output valve 13 is connected in series between the anode outlet port 205 and a second exhaust port 109. The exhaust ports 108 and 100 are each optionally connectable to other devices, such as for example, an exhaust system including an electrolyzer for re-cycling exhaust gases or liquids from the fuel cell module 300.

A check valve 15 is connected between an air supply port 106 to the ambient environment (not illustrated) and the cathode inlet port 202, such that the check valve 15 is in parallel with the input valve 10. Optionally, the check valve 15 may be a pressure sensitive mechanism that opens when the pressure at the cathode inlet port 202 drops below the air pressure of the ambient environment by a pre-set amount, known as a cracking pressure. The cracking pressure may be set to correspond to a predetermined pressure differential between the air pressure in the ambient environment and the pressure inside of the cathode inlet port 202. The predetermined pressure differential may correspond to a total volume of a mixture of gases in the cathode electrodes in the fuel cell stack 200 and, in particular, to an amount of oxygen in the cathode electrodes relative to other gases, such as for example nitrogen from the air. This is described in further detail below with reference to FIG. 3.

The hydrogen reservoir 19 is provided to store a fixed amount of hydrogen that is employed during a shutdown process of the fuel cell module 300 that is described in further detail below with reference to FIG. 3. Optionally, the hydrogen reservoir 19 may be a vessel that is appropriately sized to store enough hydrogen fuel to substantially electrochemically consume the oxygen remaining in the fuel cell module 300 when the valves 10, 11, 12 and 13 are closed and the forced inflow of air from the blower 60 is terminated. In another option, the hydrogen reservoir 19 is made-up of a predetermined length of hose or tubing (possibly coiled) for storing enough hydrogen for the same purpose. Alternatively, the hydrogen reservoir 19, whether in the form of a vessel, hose or tubing, may be smaller than required but the amount of hydrogen fuel in the hydrogen reservoir 19 is replenished as required during a shutdown process so that enough hydrogen fuel is provided to substantially electrochemically consume the remaining oxygen. Moreover, those skilled in the art would appreciate that the amount of hydrogen (or reactant of interest) remaining in a fuel cell stack after shutdown is to be taken into consideration when sizing a hydrogen (reactant) reservoir. The amount of hydrogen to be provided is preferably also adjusted to account for the amount of air or oxygen, if any, that is expected to flow into the fuel cell stack during the shutdown procedure, as will be further discussed below.

The flow control device 14 is provided to regulate the supply of hydrogen fuel delivered to the anode inlet port 204 by, for example, setting the pressure of the hydrogen fuel delivered to the anode inlet port 204. Optionally, the flow control device 14 may be a forward pressure regulator that is dome loaded using air pressure in combination with a bias spring. The forward pressure regulator sets the pressure at the anode inlet port 204 relative to the pressure at the cathode inlet port 202 by some amount. For example, the pressure at the anode inlet port 204 may be regulated to be higher than the pressure at the cathode inlet port 202 by a predetermined fixed amount. Alternatively, a flow control device may be used that requires a power supply for operation, whereas a flow control device may also be a passive element, such as for example, a passive forward pressure regulator.

The fuel cell module 300 optionally includes a hydrogen recirculation pump 16 connecting the anode outlet port 205 to the anode inlet port 204. During normal operation of the fuel cell module 300 the hydrogen recirculation pump 16 is operable to re-circulate some portion of the unused hydrogen expelled through the anode outlet port 205 back to the anode inlet port 204.

Examples of the types of valves that are usable for the valves 10, 11, 12 and 13 include, without limitation, normally closed valves, normally open valves and latching valves. Those skilled in the art would appreciate that various other types of valves may be suitably employed.

Optionally, some of the valves 10, 11, 12 and 13 may be normally closed valves. A normally closed valve is opened, thus permitting free flow of gases (or liquids), only when a control signal (or some electromotive force) is continuously supplied to the particular valve. That is, when power is not supplied to a particular normally closed valve, the valve remains closed, thus preventing the free flow of gases (or liquids) through the valve, Optionally, some of the valves 10, 11, 12 and 13 may be normally open valves. A normally open valve is closed, thus stopping the free flow of gases (or liquids), only when a control signal (or some electromotive force) is continuously supplied to the particular valve. That is, when power is not supplied to a particular normally open valve, the valve remains open, thus allowing the free flow of gases (or liquids) through the valve.

Optionally, some of the valves 10, 11, 12 and 13 may be latching valves. A latching valve requires a control signal pulse to switch between "open" and "closed" positions. In the absence of a control signal pulse (or another electromotive pulse) a latching valve remains in the position it is in without change.

During normal (i.e. energy producing or an "on" state) operation of the fuel cell module 300 the valves 10, 11, 12 and 13 are open permitting the free flow of gases (and liquids) to/from the respective ports 202, 203, 204 and 205. Moreover, power is supplied to the blower 60, the flow control device 14 and the hydrogen re-circulation pump 16 to regulate the inflows of reactant gases into the fuel cell stack 200. Those skilled in the art will appreciate that other supporting elements are supplied with power accordingly and that energy produced by the fuel cell module 300 is coupled from the electrical connections 18*a,b*.

Oxidant for the cathode electrodes in the fuel cell stack 200 is obtained from air, which, again, is made up of approximately 20% oxygen. The blower 60 forces air into the cathode inlet port 202 via the open input valve 10. Once inside the cathode electrodes some of the oxygen from the air is employed in the electrochemical reaction (2) described above.

Hydrogen fuel travels through the fuel supply port 107 into the anode inlet port 204 via the hydrogen reservoir 19 and the flow control device 14. The hydrogen recirculation pump 16 also contributes to the hydrogen fuel supply delivered to the anode inlet port 204, as it operates to force some portion of the unused hydrogen that is expelled from the anode outlet port 205 back into the anode inlet port 204. Once inside the anode electrodes some of the hydrogen is employed in electrochemical reaction (1) described above.

Excess exhaust gases and liquids from the cathode outlet port 203 and the anode outlet port 205 flow through the corresponding output valves 11 and 13 and out of the fuel cell module 300 through exhaust ports 108 and 109, respectively.

The check valve 15 remains closed during normal operation since the pressure in the cathode inlet port 202 is equal to or greater than the air pressure of the ambient environment.

When a conventional fuel cell module is shutdown the conditions within the fuel cell stack change. The conditions change because elements that support and regulate the operation of the fuel cell stack switch to their respective shutdown states. For example, the input and output valves are closed, which cuts off the supply inflows and exhaust outflows. Moreover, when an element such as a flow control device switches to a shutdown state internal conditions, such as for example, the pressure within the anode electrodes change. When the internal conditions of the fuel cell stack change the hydrogen and oxygen remaining in the fuel cell stack and the feed lines (between the fuel cell stack and the closed valves) are often substantially consumed in combustion reactions as opposed to being consumed in the electrochemical reactions (1) and (2), as described above.

The fuel cell module 300 illustrated in FIG. 2 is not a conventional fuel cell module, as the components of the fuel cell module 300 are configured to passively reduce the overall amount of combustion of hydrogen and oxygen within the fuel cell stack 200 during a shutdown process. This is accomplished by passively inducing an increase in the electrochemical consumption of hydrogen and oxygen that is left inside the fuel cell module 300 relative to what would normally occur during a shutdown process in a conventional fuel cell module.

In particular, the hydrogen reservoir 19 serves as a source for a sufficient amount of additional hydrogen fuel for the fuel cell stack 200 after the input valve 12 has been closed. Briefly, the additional hydrogen fuel drawn from the hydrogen reservoir 19, in combination with other parts of the fuel cell module 300, induces the electrochemical consumption of the oxygen remaining inside the fuel cell stack 200. Also, since the source of the oxygen is air (which is approximately 80% nitrogen) the electrodes within the fuel cell stack 200 are passively blanketed with nitrogen. A high concentration of nitrogen reduces the amount of combustion that occurs within the fuel cell stack 200. The passive blanketing process is a function of the change in pressures within the fuel cell module 300 and specifically within the fuel cell stack 200. The blanketing process that occurs during a shutdown process is described in detail below with reference to FIG. 3 and continued reference to FIG. 2.

Figure 3:
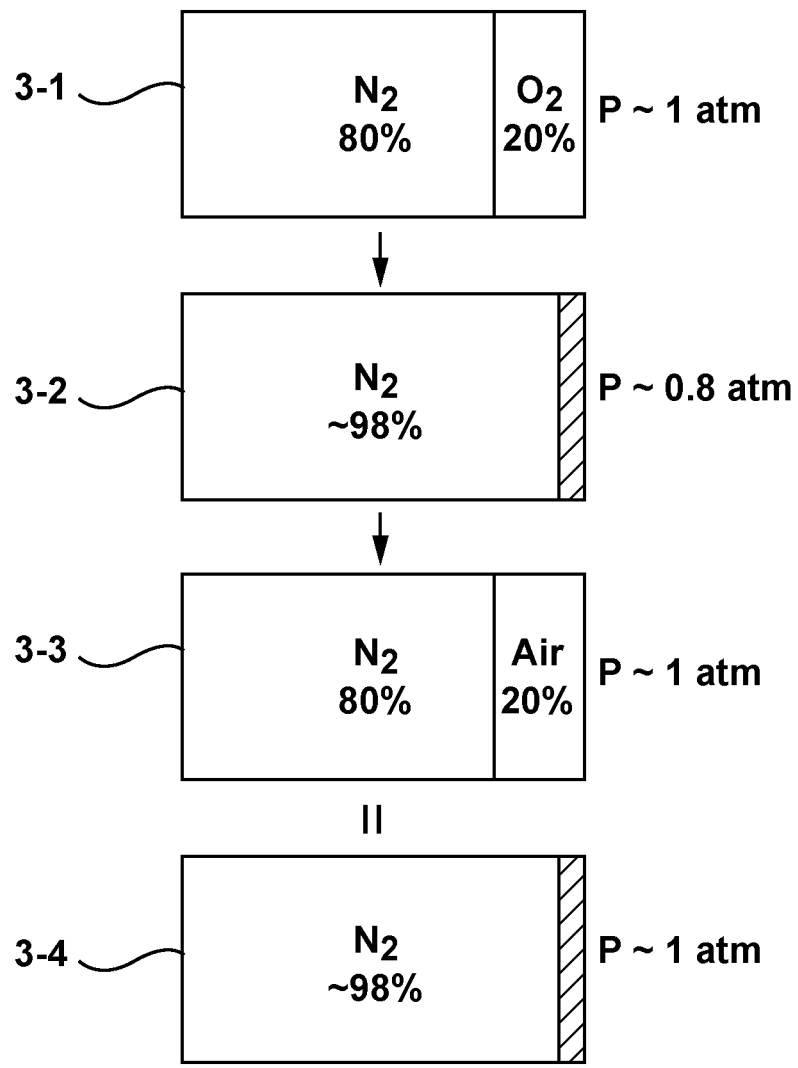
FIG. 3 is a chart illustrating the composition of gases present in cathode electrodes of the fuel cell module shown in FIG. 2 during sequential stages of a shutdown process.

FIG. 3 shows a chart illustrating an approximate and simplified breakdown of the mixture of gases present in the cathode electrodes of the fuel cell stack 200 shown in FIG. 2 during sequential stages of a shutdown period. FIG. 3 is provided only as an aid for the visualization of a substantially continuous and fluid process and it is in no way intended to limit the scope of the invention as claimed in the following section.

When the fuel cell module 300 is shutdown the inflows of reactant gases (hydrogen fuel and oxygen carried in the air) are cutoff so that the fuel cell stack 200 is effectively starved of the reactant gases that are needed to continue the electrochemical reactions (1) and (2). In order to do this, the valves 10, 11, 12 and 13 are closed and the power supplied to the blower 60, the flow control device 14 and the hydrogen recirculation pump 16 is cut-off. Closing the output valves 11 and 13 reduces the amount of gases that leak into the cathode and anode electrodes, respectively, via the corresponding outlets 203 and 205, when the fuel cell module 300 is shut down.

The role of the parasitic load 17, whether it is connected permanently or not, is to limit the voltage of the fuel cell stack 200 (i.e. the stack voltage) when the fuel cell module 300 is shutdown and/or de-coupled from the actual load. If the parasitic load 17 is not connected permanently, the parasitic load 17 is coupled across the electrical connections 18a,b immediately before or after a shutdown process is initiated. Preventing the output voltage of the fuel cell stack 200 from reaching a very high level helps to limit an electrochemical corrosion mechanism that can be triggered by a high stack voltage. The presence of the parasitic load 17 further induces the electrochemical consumption of the hydrogen and oxygen remaining within the fuel cell module 300 when a shutdown process is initiated.

Specifically, the parasitic load 17 passively induces the electrochemical consumption of the remaining reactant gases by providing a path for current and voltage to be discharged from the fuel cell stack 200. As the concentration of the reactant gases is reduced on either one or both of the anode or cathode electrodes, the electrochemical potential of the constituent fuel cells (measured as voltage) of the fuel cell stack 200 decreases. If the parasitic load 17 is a simple resistor, as the fuel cell voltage decreases, the corresponding current flowing through the resistor also decreases. This coupling between the gradual decrease in fuel cell voltage potential and the resulting decrease in current dissipation from a static resistor results in a gradual decrease in fuel cell voltage without the danger of fuel cells going negative within the fuel cell stack, as would be the case if a larger current draw was occurring without sufficient supply of reactant gases.

Referring now to 3-1 in FIG. 3, immediately after a shutdown process is initiated the cathode electrodes within the fuel cell stack 200 contain a mixture of gases that roughly corresponds to the composition of air (on earth). That is, each cathode electrode in the fuel cell stack 200 contains a mixture of gases that is approximately 80% nitrogen and 20% oxygen (ignoring traces of other gases). The pressure in each cathode electrode is approximately the same as the air pressure in the ambient environment (e.g. about 1 atm).

As the conditions within the fuel cell stack change (for reasons discussed above) the oxygen in the cathode electrodes of the fuel cell stack 200 is primarily electrochemically consumed according to electrochemical reactions (1) and (2). The required hydrogen fuel used to sustain the electrochemical reactions (1) and (2) is supplied from the hydrogen reservoir 19. As the oxygen is consumed the volume of the gas mixture in the cathode electrodes drops significantly causing a corresponding drop in internal pressure within the cathode electrodes. Illustrated at 3-2 of FIG. 3 is an example of the breakdown of a mixture of gases within the cathode electrodes after the oxygen has been substantially consumed. Nitrogen makes up approximately 98% of the gases present in the cathode electrodes and the pressure within the cathode electrodes is approximately 0.8 atm.

With continued reference to FIG. 2, since the internal pressure within the cathode electrodes of the fuel cell stack 200 falls below the air pressure of the ambient environment the check valve 15 opens, presuming that the cracking pressure has been exceeded. Additional air flows into the fuel cell module 300 via the air supply port 106 and the open check valve 15 leading to a new mixture of gases in the cathode electrodes. The check valve 15 closes when the pressure within the cathode electrodes rises to a level sufficient to close the check valve (taking into consideration the tolerances of the check valve used), which will happen after a sufficient amount of air enters the cathode electrodes. When a conventional check valve is used a spring will force the valve to close once the pressure within the cathode electrodes has risen enough that a delta pressure is below the check valve cracking pressure.

Assuming that the check valve were to remain open until the pressure with the cathode electrode was approximately equivalent to that of the ambient environment, the breakdown of the new mixture of gases is illustrated at 3-3 of FIG. 3. The new mixture of gases consists of 80% nitrogen from the original mixture of gases illustrated at 3-1, and 20% of newly added air. Taking into consideration that air is about 80% nitrogen, the equivalent breakdown of the new mixture of gases shown at 3-3 is illustrated at 3-4 of FIG. 3. The total amount of nitrogen present in the cathode electrodes is about 96% and the pressure is about the same as the air pressure of the ambient environment (e.g. 1 atm). This process is repeated, with the oxygen present in the cathode electrode (being approximately 4% of the cathode electrode volume) being electrochemically consumed with hydrogen provided from the hydrogen reservoir 19. In turn, the void created in the cathode electrodes by the oxygen consumption would be filled with air from the ambient environment (once again composed of approximately 80% nitrogen and 20% oxygen). Consequently, the cathode electrodes of the fuel cell stack 200 are blanketed with predominantly nitrogen gas by this substantially continuous process.

Furthermore, the arrangement of the fuel cell module 300 illustrated in FIG. 2 also induces passive nitrogen blanketing of the anode electrodes in the fuel cell stack 200. As the hydrogen fuel from the hydrogen reservoir 19 is consumed, the volume of the gas mixture present in the anode electrodes drops, which, subsequently results in a corresponding pressure drop within the anode electrodes. The pressure drop within the anode electrodes induces a pressure gradient to be established across the respective membranes from the cathode to the anode side of each membrane in the fuel cell stack 200. This pressure gradient will passively draw nitrogen across the membranes from the respective cathode electrodes to the anode electrodes, thus, causing the anode electrodes to be blanketed with nitrogen as well.

Those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

Optionally, a fuel cell module may be configured to actively reduce the overall amount of combustion of hydrogen and oxygen within the fuel cell stack 200 during a shutdown process. For example, nitrogen from a reservoir may be injected into the cathode electrodes, the anode electrodes, or both, of the fuel cell module during a shut down process.

Optionally, and in order to achieve a more effective blanketing of the anode and cathode electrodes with nitrogen of atmospheric pressure, sufficient access to additional air may be provided to as to leave a high concentration of nitrogen remaining after the oxygen has been almost completely consumed. This in turn requires a near stoichiometric amount of hydrogen to be supplied to the anode electrodes of a fuel cell stack to facilitate the electrochemical consumption of the oxygen. More generally, at least one reactant supplied to a fuel cell must be provided with a non-reactive agent that remains within the fuel cell after the reactants have been almost completely electrochemically consumed by one another.

Still referring to FIG. 3, some aspects of restarting the fuel cell module 300 can be considered. As discussed above, at 3-3 of FIG. 3, the mixture of gasses in the cathode electrode 41 comprises about 4% oxygen and the fuel cell stack 200 has not been completely discharged by the parasitic load 17. If a need arises to re-start the fuel cell module at this time, the input valve 12 and output valve 13 may be opened, momentarily or permanently, for example using electrical power from a battery provided with the fuel cell module 300, to allow hydrogen from a pressurized fuel tank to displace the nitrogen in the anode electrode 21. With some oxygen present within the cathode electrode 41, an electrochemical reaction can commence and be used to assist the battery in re-charging the fuel cell stack 200. Once the fuel cell stack 200 is re-charged, normal operation can be re-commenced. Further, after nitrogen has been drawn into the anode electrode 21, input valve 10 and output valve 11 may be opened. Over time, for example several hours, a day or more, air or oxygen will move by natural forces into the cathode electrode 41. If the fuel cell module 300 is started up in this condition, an electrochemical reaction is again available to help re-charge the fuel cell stack 200. However, at 3-4 in FIG. 3, or near to it, very little if any oxygen is available in the cathode electrode 41 and very little, if any, electrochemical reaction is available to help re-charge the fuel cell stack 200. In this case, the fuel cell module 300 may not restart quickly in the absence of an otherwise unnecessarily large battery used to re-charge the fuel cell stack.

Figure 3B:
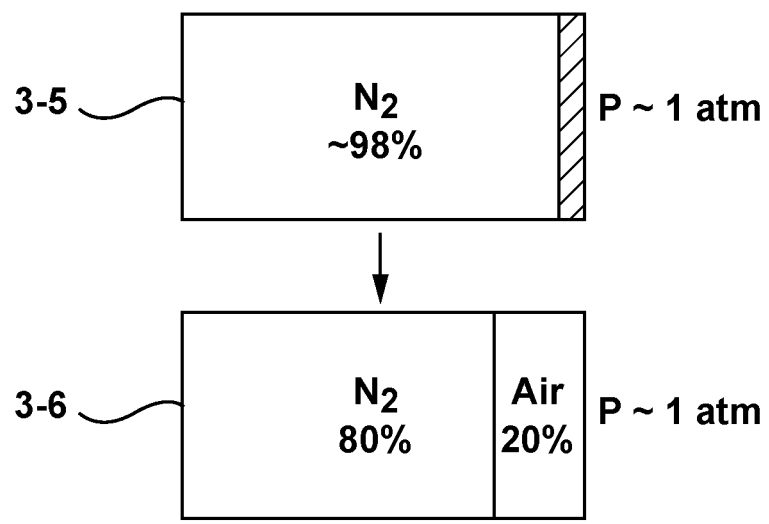
FIG. 3B is a chart illustrating the composition of gasses present in cathode electrodes of the fuel cell module shown in FIG. 2 during sequential stages of a start up process.

Referring to FIG. 3B, at the beginning of a start up method, the cathode electrode 41 is at 3-5 blanketed almost entirely with nitrogen. In order to decrease the start up time required, an amount of air is added to the cathode electrode, displacing some of the nitrogen as shown at 3-6. Oxygen in the air is now available for electrochemical reactions to help charge the fuel cell stack 200. The amount of air shown in 3-6 is only an example. The amount of air added to the cathode electrodes 41 of the fuel cell stack 200 before the fuel cell stack is recharged may be, for example, 10% to 100% of the available gas volume in the cathode electrodes 41. The air is provided by a source of energy other than the fuel cell stack, for example a battery or pressurized gas.

The fuel cell stack 200 may be considered to be charged, re-charged, or not discharged, when it reaches a selected level of charge. The selected level of charge does not need to be as large as the normal operating or maximum charge level of the fuel cell stack 200. For example, the selected level of charge may be 50% or 75% of the normal operating or maximum charge level of the fuel cell stack 200. The selected charge level is preferably sufficient for the fuel cell stack 200 to power the balance of plant. For example, the fuel cell stack 200 is preferably able when charge to operate an air blower 60 described below through its ordinary operating circuit.

Referring to FIG. 2, a pump 301 is used to move air into the cathode electrodes 41 of the fuel cell stack 200 before the fuel cell stack 200 is recharged. During a start up procedure, inlet valve 12 is opened to allow hydrogen pressurized in a tank to flow into fuel supply port 107. The hydrogen dilutes nitrogen in the anode electrodes 21 and also displaces a piston 302 in a cylinder 304 in communication with the anode inlet port 204. The opposite face of the piston 302 is in communication with the cathode supply port 202. Accordingly, the hydrogen pressure causes the piston 302 to discharge a volume of air from the cylinder 304 into the cathode electrodes 41 of the fuel cell stack 200. The cylinder 304 is recharged with air during the next shut down procedure by opening valve 307 while there is a partial vacuum in the anode electrode 21 (3-2 in FIG. 3) which causes piston 302 to retract. Alternatively, in a fuel cell module in which a sufficient vacuum is not created (for example as in FIG. 4), a spring 308 may be used. The volume of reservoir 19 is adjusted to compensate for hydrogen added to the fuel cell stack 200 when piston 302 retracts. Optionally, other pumping mechanisms may be provided to use the pressure, pressure drop, or flow of hydrogen during a start up procedure to move air into the fuel cell stack 200.

Figure 4:
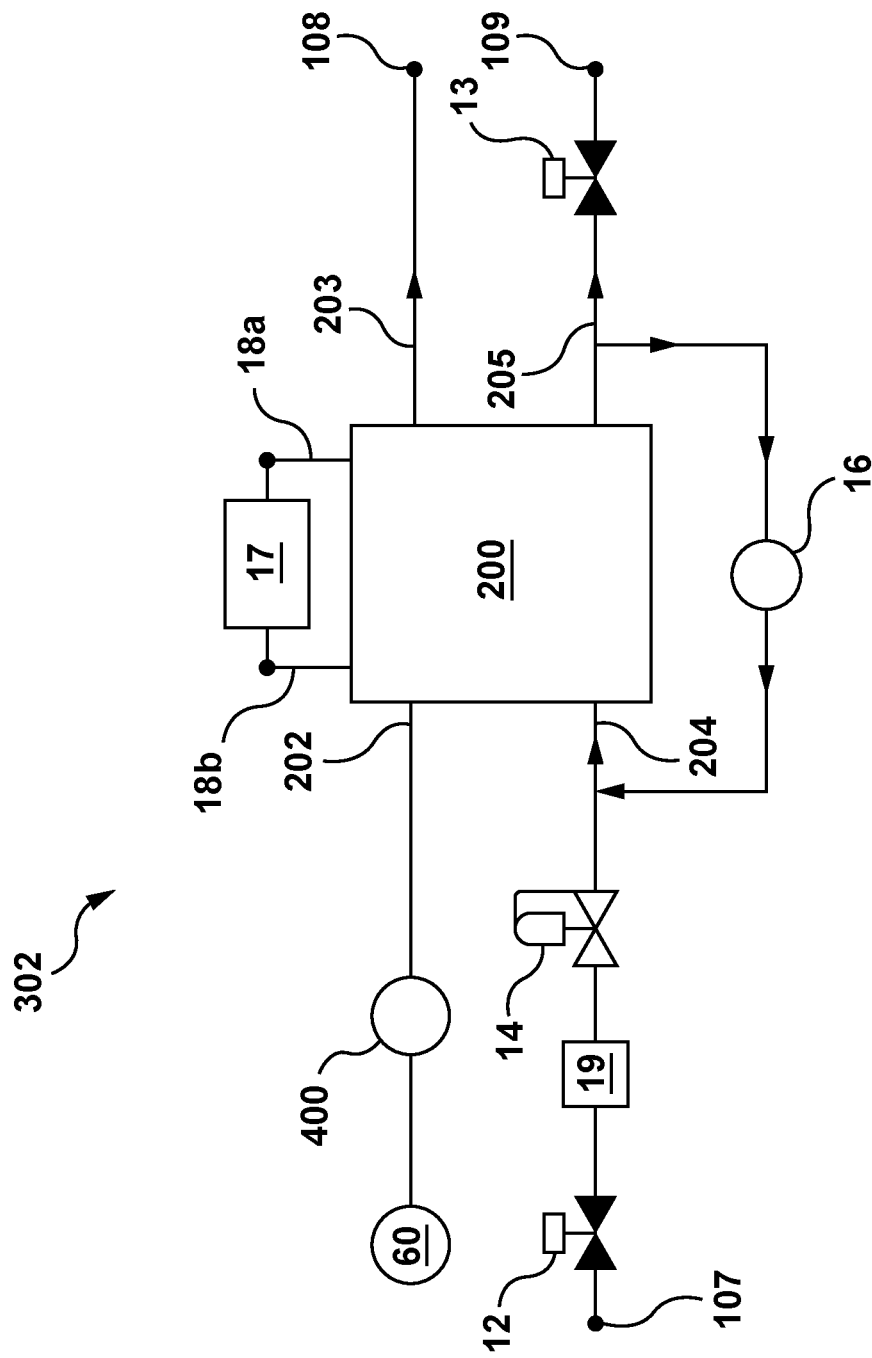
FIG. 4 is a schematic diagram illustrating a second arrangement of a fuel cell module.

Referring to FIG. 4, shown is a schematic diagram illustrating a second fuel cell module 302. Those skilled in the art will appreciate that a fuel cell module also includes a suitable combination of supporting elements, commonly referred to as balance of plant, which are not shown in FIG. 4 but could be provided with the second fuel cell module 302.

The fuel cell module 302 illustrated in FIG. 4 is similar to the fuel cell module 300 illustrated in FIG. 2. Accordingly, elements common to both fuel cell modules 300 and 302 share common reference indicia. The differences between the two fuel cell modules 300 and 302 are that the fuel cell module 302 does not include input valve 10, output valve 11, check valve 15 and air supply port 106. Further, fuel cell module 302 uses a fan 400 rather than pump 301 to supply air to the fuel cell stack 200 during a start up procedure.

The blower 60, illustrated in FIG. 4 is coupled to the cathode inlet port 202 without a valve (e.g. input valve 10) arranged there between. The blower 60 is any device (e.g., a motorized fan, a compressor, etc.) that serves to force air into the cathode inlet port 202. The blower 60 also serves to passively deter, but not necessarily stop, the free flow of air into the cathode inlet port 202 when power is cut-off from the blower 60. The blower 60 is designed or selected to operate at the fuel cell stack 200 voltage and is powered by the fuel cell stack 200 during normal operation of the second fuel cell module 302.

During normal operation, the fuel cell module 302 operates in a substantially identical manner to fuel cell module 300 described above.

During a shutdown process the operation of the fuel cell module 302 is similar to the operation of the fuel cell module 300; however, as already noted, there is no check valve to deter and permit free air flow into the cathode inlet port 202. Instead, the flow of air into the cathode inlet port 202 is slowed down enough by the path through the blower 60 that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4).

In other words, the partial restriction of the air flow through the blower 60 prevents the continuous, rapid replenishment of the electrochemically consumed oxygen on the cathode electrode which would prevent the formation of a predominately nitrogen rich gas composition on the cathode electrode. Thus a gradual depletion of oxygen concentration on the cathode electrode follows a similar process as described above with respect to FIG. 2, with the exception that no large measurable vacuum is created in the cathode electrodes. Rather the electrochemical depletion of oxygen creates a volumetric void and a localized depleted oxygen concentration in the cathode electrodes that draws additional air to the electrode surface (through a combination of pressure and concentration differential driving forces).

Moreover, since there is no output valve (e.g. output valve 11) to block the path from the cathode outlet port 203 to the first exhaust port 108, some air flows into the cathode electrodes via the cathode outlet port 203 and the first exhaust port 108. Also, as described above with respect to FIG. 2, as hydrogen is consumed, in the fuel cell module 302 (of FIG. 4), the pressure in the anode electrodes drops causing nitrogen to be drawn across the respective membranes.

It should also be noted that since valves 10 and 11 from FIG. 2 are not included in fuel cell module 302, air will continue to diffuse into the cathode electrode. Over time this will cause the gas composition in the cathode electrodes to equalize to approximately that of the surrounding atmosphere. This in turn will gradually result in a change in concentration in the anode electrode gas composition, such that over an extended period of time it can be assumed that both the anode and cathode electrode gas compositions will be approximately that of the surrounding atmosphere. In such embodiments slightly higher levels of degradation are expected compared to the previous examples described above.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

As mentioned above, in the fuel cell module 302 the cathode electrodes eventually contain air after the fuel cell module 302 is shut down. This makes oxygen available to support electrochemical reactions to help charge the stack on start up. However, there is a period of time, which may range from five minutes to up to a day, after the fuel cell module 302 is shut down but before air re-enters the cathode electrodes in an amount sufficient to provide a rapid start up. During this period of time, the cathode electrodes are completely or partially blanketed with nitrogen, for example as in 3-5 of FIG. 3B, and start up time can be decreased by forcing air into the cathode electrodes.

To move air into the cathode electrodes, a fan 400 is turned on until the fuel cell stack 200 is able to operate blower 60. Fan 400 may be, for example, a muffin fan of the type used to cool electronics. Fan 400 is operable by way of a DC voltage supplied from a battery, for example a battery used to operate valves 12, 13 and electronic controls for the fuel cell module 302. Operating fan 400 moves air into the cathode electrodes, for example as in 3-6 of FIG. 3A, to decrease the start up time.

Optionally, fan 400 may be combined with other components of the fuel cell module 302. For example, fan 400 may be a second winding within blower 60. Alternatively, fan 400 may be a flow sensor used during normal operation to measure the output of blower 60. Fan 400 may also be located downstream of cathode outlet 203, or upstream of blower 60, rather than in the position between blower 60 and cathode inlet 202 shown in FIG. 4. Fan 400 may also be located in parallel with blower 60, with or without an isolation valve, or in communication with a T-junction in a pipe connected to cathode inlet 202 or cathode outlet 203, with or without an isolation valve.

Figure 5:
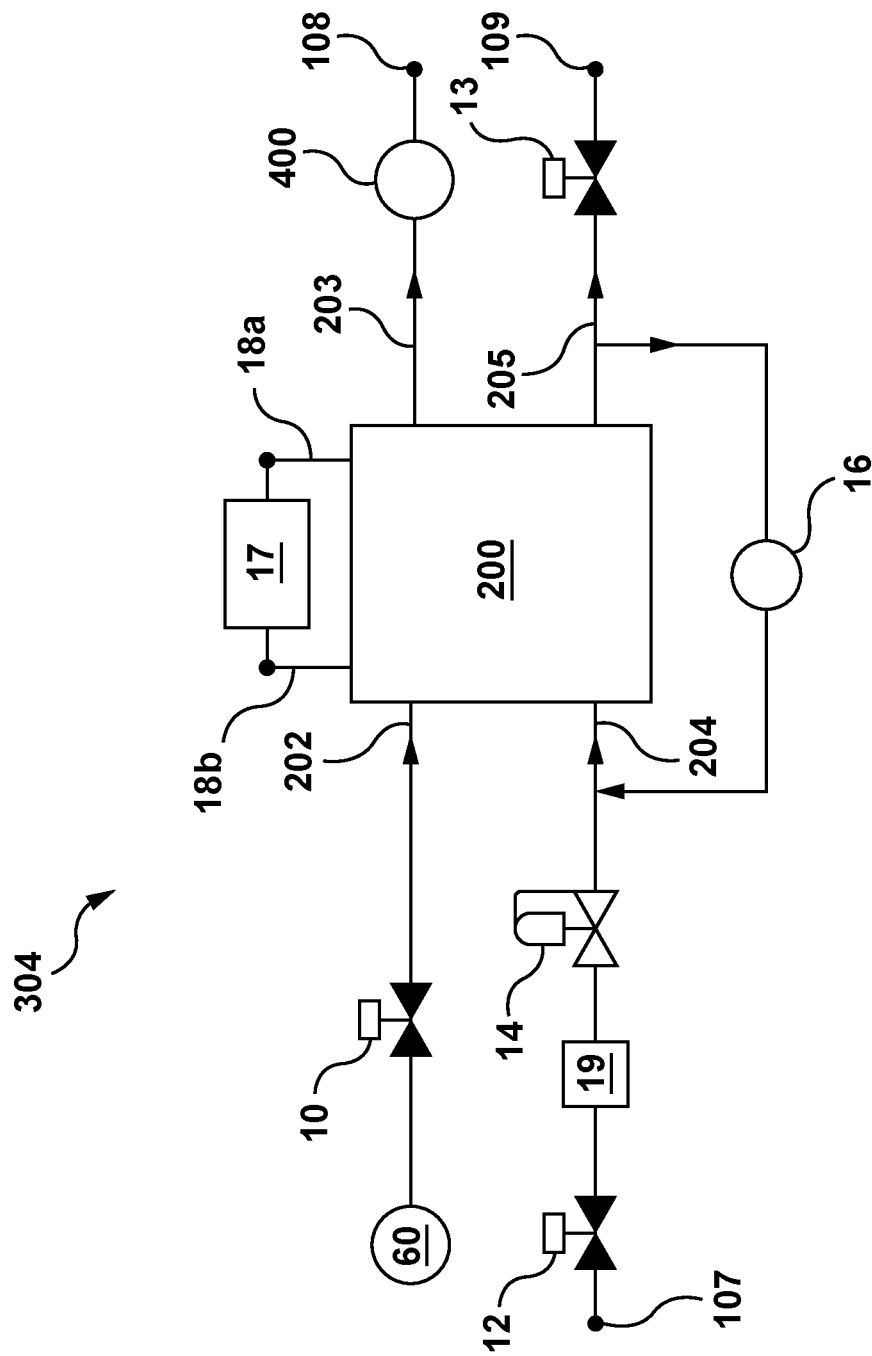
FIG. 5 is a schematic diagram illustrating a third arrangement of a fuel cell module.

Referring to FIG. 5, shown is a schematic diagram illustrating a third fuel cell module 304. Those skilled in the art will appreciate that a fuel cell module also includes a suitable combination of supporting elements, commonly referred to as balance of plant, which are not shown in FIG. 5 but could be provided with the third fuel cell module 304.

The fuel cell module 304 illustrated in FIG. 5 is similar to the fuel cell module 300 illustrated in FIG. 2. Accordingly, elements common to both fuel cell modules 300 and 304 share common reference indicia. The differences between the two fuel cell modules 300 and 304 are that the fuel cell module 304 does not include output valve 11, check valve 15 and air supply port 106. Fuel cell module 304 also uses a fan 400 rather than a pump 301, however, fuel cell module 300 may alternatively use a fan 400 and fuel cell module 304 may alternatively use a pump 301.

During normal operation the fuel cell module 304 operates in a substantially identical manner to fuel cell module 300, described above.

During a shutdown process the operation of the fuel cell module 304 is similar to the operation of the fuel cell module 302 described above. Again, there is no check valve to deter and permit free air flow into the cathode inlet port 202. Moreover, the input valve 10 is arranged between the blower 60 and the cathode inlet port 202, so additional air cannot flow into the cathode electrodes of the fuel cell stack 200 via the blower 60 during a shutdown process since the input valve 10 is closed. Instead, the flow of air into the cathode electrodes comes through the cathode outlet port 203 via the first exhaust port 108. In such an embodiment it is desirable to size and/or shape the first exhaust port 108 such that the flow of air in the reverse direction is slowed down enough by the reverse path through the first exhaust port 108 so that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4). Also, as described above with respect to FIG. 2, as hydrogen is consumed, in the fuel cell module 304 (of FIG. 5), the pressure in the anode electrodes drops causing nitrogen to be drawn across the respective membranes.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

During the state up procedure, inlet valve 10 is opened before fan 400 is turned on.

Figure 6:
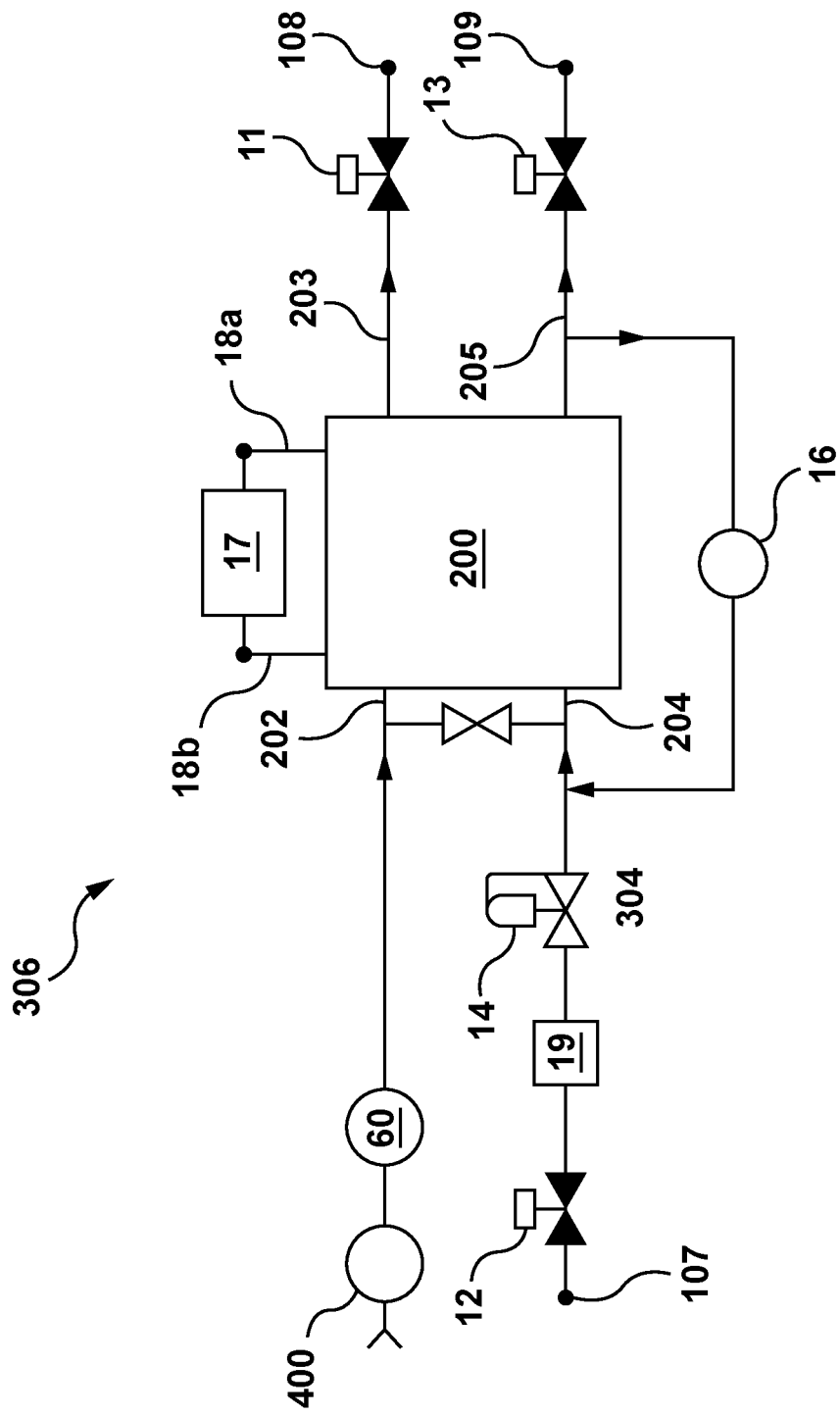
FIG. 6 is a schematic diagram illustrating a fourth arrangement of a fuel cell module.

Referring to FIG. 6, shown is a schematic diagram illustrating a fourth fuel cell module 306 according to aspects of another embodiment of the invention. Those skilled in the art will appreciate that a fuel cell module also includes a suitable combination of supporting elements, commonly referred to as balance of plant, which are not shown in FIG. 6 but could be provided with the third fuel cell module 306.

The fuel cell module 306 illustrated in FIG. 6 is similar to the fuel cell module 300 illustrated in FIG. 2. Accordingly, elements common to both fuel cell modules 300 and 306 share common reference indicia. The differences between the two fuel cell modules 300 and 306 are that the fuel cell module 306 does not include input valve 10, check valve 15 and air supply port 106. Further, fuel cell module 306 is shown using a fan 400 although it may also use a pump 301.

As in FIG. 4, the blower 60 illustrated in FIG. 6 is coupled to the cathode inlet port 202 without a valve (e.g. input valve 10) arranged there between. The blower 60 is any device (e.g., a motorized fan, a compressor, etc.) that serves to force air into the cathode inlet port 202. The blower 60 also serves to passively deter, but not necessarily stop, the free flow of air into the cathode inlet port 202 when power is cut-off from the blower 60.

During normal operation the fuel cell module 306 operates in a substantially identical manner to fuel cell module 300, described above.

During a shutdown process the operation of the fuel cell module 306 is similar to the operation of the fuel cell modules 300 and 302; however, as already noted, there is no check valve to deter and permit free air flow into the cathode inlet port 202. Instead, the flow of air into the cathode inlet port 202 is slowed down enough by the path through the blower 60 that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4).

Moreover, since the fuel cell module 306 includes the output valve 11, additional air is prevented from entering the cathode outlet port 203 during a shutdown process since the output valve 11 is closed during the shutdown process. Also, as described above with respect to FIG. 2, as hydrogen is consumed, in the fuel cell module 306 (of FIG. 6), the pressure in the anode electrodes drops causing nitrogen to be drawn across the respective membranes.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

During the start up procedure, outlet valve 11 is opened before fan 400 is turned on.

With reference to FIGS. 2, 4, 5 and 6, as an alternative for fuel cell modules 300, 302, 304, 306 an optional second check valve 26 (illustrated only in FIG. 6) can be coupled between the anode inlet port 204 and the cathode inlet port 202. The second check valve 26 is configured to open when there is a pre-determined pressure differential between the pressure in the anode electrode(s) and the cathode electrode(s) during a shutdown process permitting flow from only the cathode electrodes(s) to the anode electrode(s); and, during normal operation the second check valve 26 is configured to remain closed.

The second check valve 26 is used to ensure that nitrogen from the cathode electrodes is passed to the anode electrodes when a sufficient portion of the hydrogen fuel from the hydrogen reservoir 19 is consumed electrochemically, which will result in a corresponding pressure drop as described above. This is to supplement and/or replace the need for nitrogen diffusion across the respective membranes in the fuel cell stack 200, as a means for blanketing the anode electrode(s).

With reference to FIGS. 4, 5 and 6, as an alternative for fuel cell modules 302, 304, 306, the fan 400 may be omitted and its function replaced by an additional circuit for driving the blower 60 using a battery, for example a battery already present in the balance of plant. As mentioned above, blower 60 is driven during normal operation by the fuel cell stack. In this alternative, the battery is connected to blower 60 to operate blower 60 as described for fan 400 during start-up. The battery is able to turn blower 60 only slowly, for example at less than 25% or less than 10% of the normal operating speed of the blower 60. The battery may be connected to the blower through a transformer to provide voltage and current output more appropriate for moving the blower. Alternatively, the battery may be connected to the blower 60 through a circuit containing one or more capacitors configured to provide pulses of electricity to the blower 60. The battery to blower circuit is switched on at or near the beginning of the start-up procedure. After a period of time, optionally determined by polling the fuel cell stack 200 to determine if the fuel cell stack 200 has is re-charged, the battery to blower circuit is switch off and the fuel cell stack 200 is electrically connected to the blower 60.

Optionally, though not preferably, the fuel cell stack 200 can be used to drive fan 400 or blower 60, or assist the battery in driving fan 400 or blower 60, before the fuel cell stack 200 is charged. This option is not generally preferred because drawing power from the fuel cell stack 200 delays re-charging the fuel cell stack 200 relative to an option in which the same amount of power is provided by a battery. However, this option may be useful in a case in which battery capacity is limited. If a fan 400 has as sufficiently low resistance, the benefit derived from accelerating chemical reactions in the fuel cell stack 200 may justify drawing power from the fuel cell stack 200. If there is no fan 400, the fuel cell stack 200 can be connected to blower 60 through a start-up circuit having one or more transistors or capacitors configured to supply the blower 60 with pulsed or continuous power while reducing the apparent resistance of the blower 60 or otherwise restricting the power drawn from the fuel cell stack 200. In a further option, a start-up procedure may have an initial period of time in which a fan 400 or blower 60 is driven by a battery followed by an intermediate period of time in which fan 400 is electrically connected to the fuel cell stack 200, or a blower 60 is electrically connected to the fuel cell stack through a power limiting circuit, without or without the battery also being connected to the fan 400 or blower 60. This intermediate period of time ends when the fuel cell stack 200 is recharged. The recharged state may be determined by polling the fuel cell stack 200 to determine if it has reached a specified charge level, for example 50% or more or 75% or more of its normal operating charge or maximum charge. The fuel cell module 302, 304, 306 then resumes normal operation.

What has been described is merely illustrative of the application of the principles of the invention. Those skilled in the art would appreciate that other arrangements are possible without departing from the scope of the present invention. It is therefore to be understood that within the scope of the appended claims, the invention may be practiced otherwise than as specifically described herein.

What is claimed is:

1. A fuel cell module, comprising:
   a fuel cell stack comprising:
      a fuel cell comprising an anode electrode and a cathode electrode;
      a cathode inlet port fluidly connected to the cathode electrode;
      a cathode outlet port fluidly connected to the cathode electrode;
      an anode inlet port fluidly connected to the anode electrode; and
      an anode outlet port fluidly connected to the anode electrode;
   a blower located upstream of the cathode inlet port; and
   a fan located downstream of a cathode outlet of the fuel cell stack, wherein the fan is not in direct fluid communication with the cathode inlet;
   wherein the fuel cell module includes a first valve between the blower and the fuel cell stack, wherein the first valve is configured to control airflow between the blower and the fuel cell stack.

2. The fuel cell module of claim 1, further comprising a second valve coupled between the anode inlet port and the cathode inlet port.

3. The fuel cell module of claim 2, wherein the second valve is a check valve.

4. The fuel cell module of claim 3, wherein the check valve is a pressure responsive valve.

5. The fuel cell module of claim 1, further comprising a pump having a piston in communication with the anode inlet port and the cathode inlet port.

6. The fuel cell module of claim 1, further comprising a flow control device configured to be fluidly connected to a fuel source and fluidly connected to the anode inlet port, wherein the flow control device regulates a supply of fuel delivered to the fuel cell stack through the anode inlet port.

7. The fuel cell module of claim 6, wherein the fuel comprises hydrogen.

8. The fuel cell module of claim 1, wherein the valve is a check valve.

9. The fuel cell module of claim 8, wherein the check valve is a pressure responsive valve.

10. The fuel cell module of claim 1, wherein the blower is a motorized fan.

11. The fuel cell module of claim 1, wherein the fan is configured to cool electronics of the blower.

12. The fuel cell module of claim 1, wherein the fan includes a winding.

13. A fuel cell module, comprising:
- a fuel cell stack comprising:
  - a fuel cell comprising an anode electrode and a cathode electrode;
  - a cathode inlet port fluidly connected to the cathode electrode;
  - a cathode outlet port fluidly connected to the cathode electrode;
  - an anode inlet port fluidly connected to the anode electrode; and
  - an anode outlet port fluidly connected to the anode electrode;
- a blower located upstream of the cathode inlet port; and
- a pump located downstream of a cathode outlet of the fuel cell stack,
- wherein the pump is not in direct fluid communication with the cathode inlet; wherein the fuel cell module includes a valve between the blower and the fuel cell stack, wherein the valve is configured to control airflow between the blower and the fuel cell stack.

14. The fuel cell module of claim 13, wherein the valve is a check valve.

15. The fuel cell module of claim 13, wherein the check valve is a pressure responsive valve.

16. The fuel cell module of claim 13, wherein the blower is a motorized fan.

17. The fuel cell module of claim 13, further comprising a flow control device configured to be fluidly connected to a fuel source and fluidly connected to the anode inlet port, wherein the flow control device regulates a supply of fuel delivered to the fuel cell stack through the anode inlet port.

18. The fuel cell module of claim 17, wherein the fuel comprises hydrogen.

19. The fuel cell module of claim 13, further comprising a pump having a piston in communication with the anode inlet port and the cathode inlet port.

20. The fuel cell module of claim 13, further comprising a second valve coupled between the anode inlet port and the cathode inlet port.

* * * * *